United States Patent
Green

(10) Patent No.: US 9,578,861 B2
(45) Date of Patent: Feb. 28, 2017

(54) GROUND FISHING RODS

(71) Applicant: Andre Green, Pittsburgh, PA (US)

(72) Inventor: Andre Green, Pittsburgh, PA (US)

( * ) Notice: Subject to any disclaimer, the term of this patent is extended or adjusted under 35 U.S.C. 154(b) by 172 days.

(21) Appl. No.: 14/624,244

(22) Filed: Feb. 17, 2015

(65) Prior Publication Data

US 2015/0230444 A1 Aug. 20, 2015

Related U.S. Application Data

(60) Provisional application No. 61/940,809, filed on Feb. 17, 2014.

(51) Int. Cl.

| A01K 75/02 | (2006.01) |
|---|---|
| A01K 85/00 | (2006.01) |
| A01K 89/08 | (2006.01) |
| A01K 89/017 | (2006.01) |
| A47C 7/72 | (2006.01) |
| A01K 97/10 | (2006.01) |
| A01K 97/22 | (2006.01) |
| A47C 1/14 | (2006.01) |

(52) U.S. Cl.
CPC ............ *A01K 89/08* (2013.01); *A01K 89/017* (2013.01); *A01K 97/10* (2013.01); *A01K 97/22* (2013.01); *A47C 1/14* (2013.01); *A47C 7/72* (2013.01); *A47C 7/725* (2013.01)

(58) Field of Classification Search
CPC ...... A01K 89/08; A01K 89/017; A01K 97/10; A01K 97/22; A47C 1/14; A47C 7/72; A47C 7/725

USPC .......................................... 43/17.5, 21.2, 25
See application file for complete search history.

(56) References Cited

U.S. PATENT DOCUMENTS

| 4,780,979 | A | * | 11/1988 | Dyck | A01K 97/01 43/17 |
|---|---|---|---|---|---|
| 4,953,317 | A | * | 9/1990 | Ruchel | A01K 97/01 43/17 |
| 5,269,088 | A | * | 12/1993 | Slaback, Jr. | A01K 97/12 43/17 |
| 5,598,656 | A | * | 2/1997 | Strasser | A01K 97/01 43/17 |
| 7,185,456 | B1 | * | 3/2007 | Schoenecker | A01K 97/01 43/17 |
| 2008/0282597 | A1 | * | 11/2008 | Gascoingne | A01K 89/08 43/17 |
| 2012/0210626 | A1 | * | 8/2012 | Manlick | A01K 97/01 43/4.5 |
| 2013/0014424 | A1 | * | 1/2013 | Weishner | A01K 79/02 43/17.5 |

* cited by examiner

*Primary Examiner* — Kristen Matter
(74) *Attorney, Agent, or Firm* — Gary D. Topolosky

(57) ABSTRACT

A fishing device comprising a main housing unit that can be secured to a ground surface with a plurality of hammerable nails; a reel of fishing line stored on a spool in the main housing unit; a nozzle-shaped, lockable top for the main housing unit through which the fishing line is threaded; and a handle on the lockable top for spinning and flicking the lockable top in order to cast the fishing line outwardly therefrom. There is a smaller, more portable lake or river model and a larger ocean version. A fishing chair is also disclosed.

15 Claims, 5 Drawing Sheets

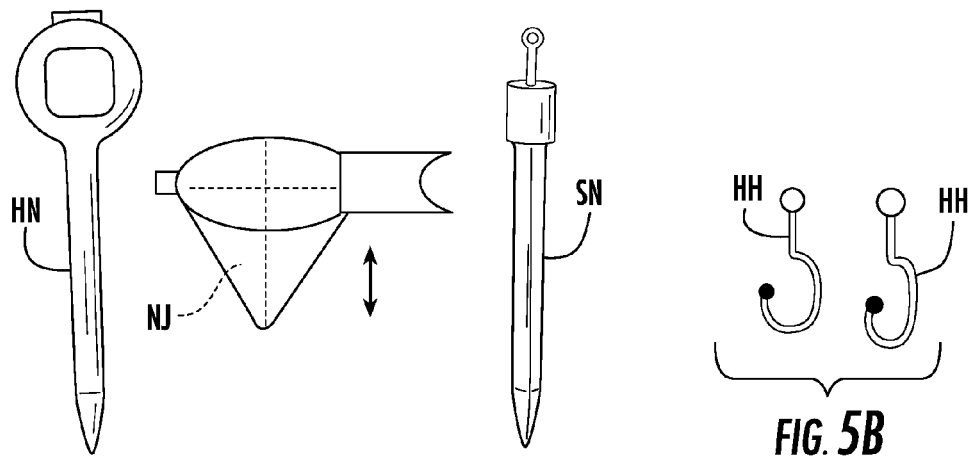
FIG. 5A
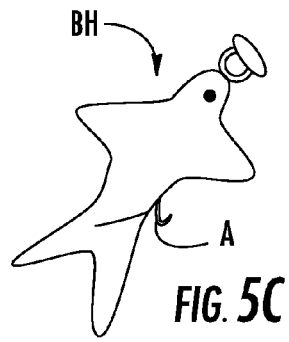
FIG. 5B
FIG. 5C
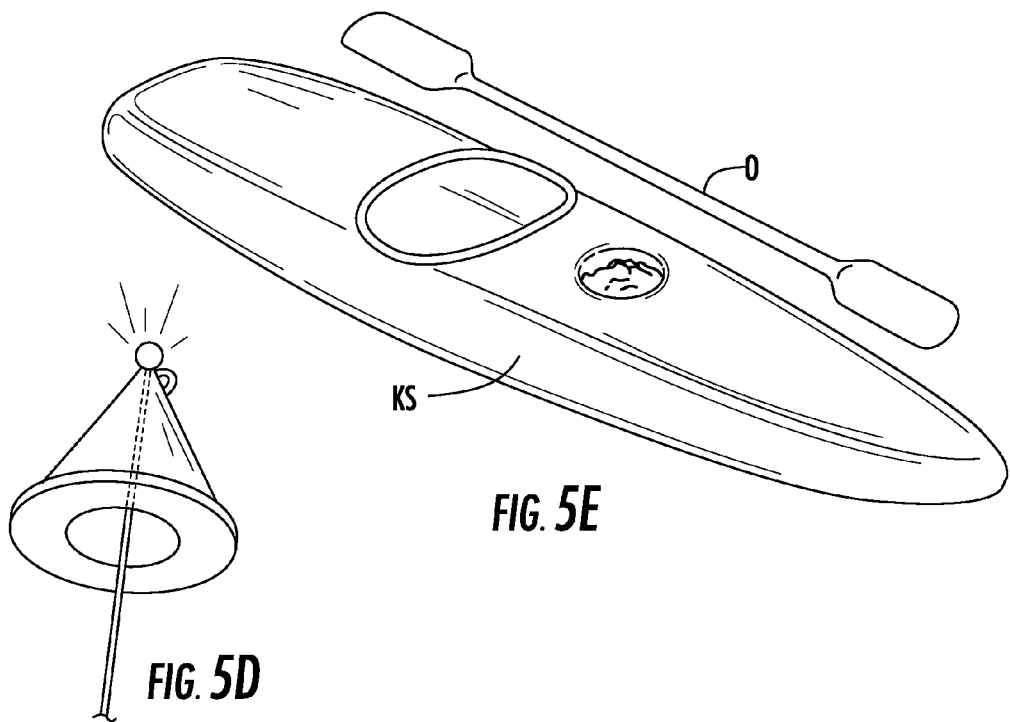
FIG. 5D
FIG. 5E

GROUND FISHING RODS

CROSS-REFERENCE TO RELATED APPLICATION

This is a perfection of U.S. provisional application Ser. No. 61/940,809, filed on Feb. 17, 2014, the disclosure of which is fully incorporated by reference herein.

FIELD OF THE INVENTION

These inventions relate to improvements in fishing from solid ground, i.e. a riverbed, shore, beach, etc. They can be used in numerous contexts and for catching various sizes/shapes/breeds of fish. The first model is internally referred to as an Ocean Rod. It may resemble a mailbox in overall shape with a square or oval bottom, in cross-section. With any one or more of these inventions, there is provided "a new way to fish!"

The second model is more suitable for lake or river fishing. The apparatus can be affixed to the ground using only two nail holders.

The third model consists of a chair variation, internally referred to as a ground rod chair. It resembles most any chair in size and shape with numerous attachments and several more options to be added thereto.

The fourth model is a rod holder variety, to be sold with at least one nail jack. It would sit, above ground, at about three feet, or rest as tall as half a man. It can be further secured using a chain link extension from the ground to a connector link more than halfway up from the ground.

In addition to the four models above, other accessories include variations in the nail/holder shapes, inflatable food baiting devices (with or without scent additions), inflatable, lighted fishing line bobs, preferred ground rod fishhooks and other hook attachments for baiting purposes.

SUMMARY OF THE INVENTION

As an alternative to known boat/vehicle fishing devices, including rod holders and various fishing "chairs", there is shown a new way for fishing using a integral, single unit Ocean rod (as per FIG. 1), a Lake or River rod (per FIG. 2), a Chair rod configuration (FIG. 3) and a more uniform Rod Holder arrangement (FIG. 4). Numerous types of accessories can be used in conjunction with any one or more of the foregoing, or with existing boat and other shore fishing apparatus.

BRIEF DESCRIPTION OF THE DRAWINGS

Further features, objectives and advantages for these inventions will become clearer when referring to the following detailed description made with reference to the accompanying drawings in which:

FIG. 5A is a front plan view showing several embodiments of nail jacks for use with the present invention;

FIG. 5B is a front plan view of two representative ground rod hook accessories for use with the present invention;

FIG. 5C is a top plan view showing several variations of inflatable (or blow up) bait holders for use with the present invention;

FIG. 5D is a top perspective view showing one variation of inflatable (blow up) fishing line bobber for use with the aforementioned inventions; and FIG. 5E is a top plan view of a surfboard or kayak alternative food delivery means for fishing.

DETAILED DESCRIPTION OF PREFERRED EMBODIMENTS

Figure 2:
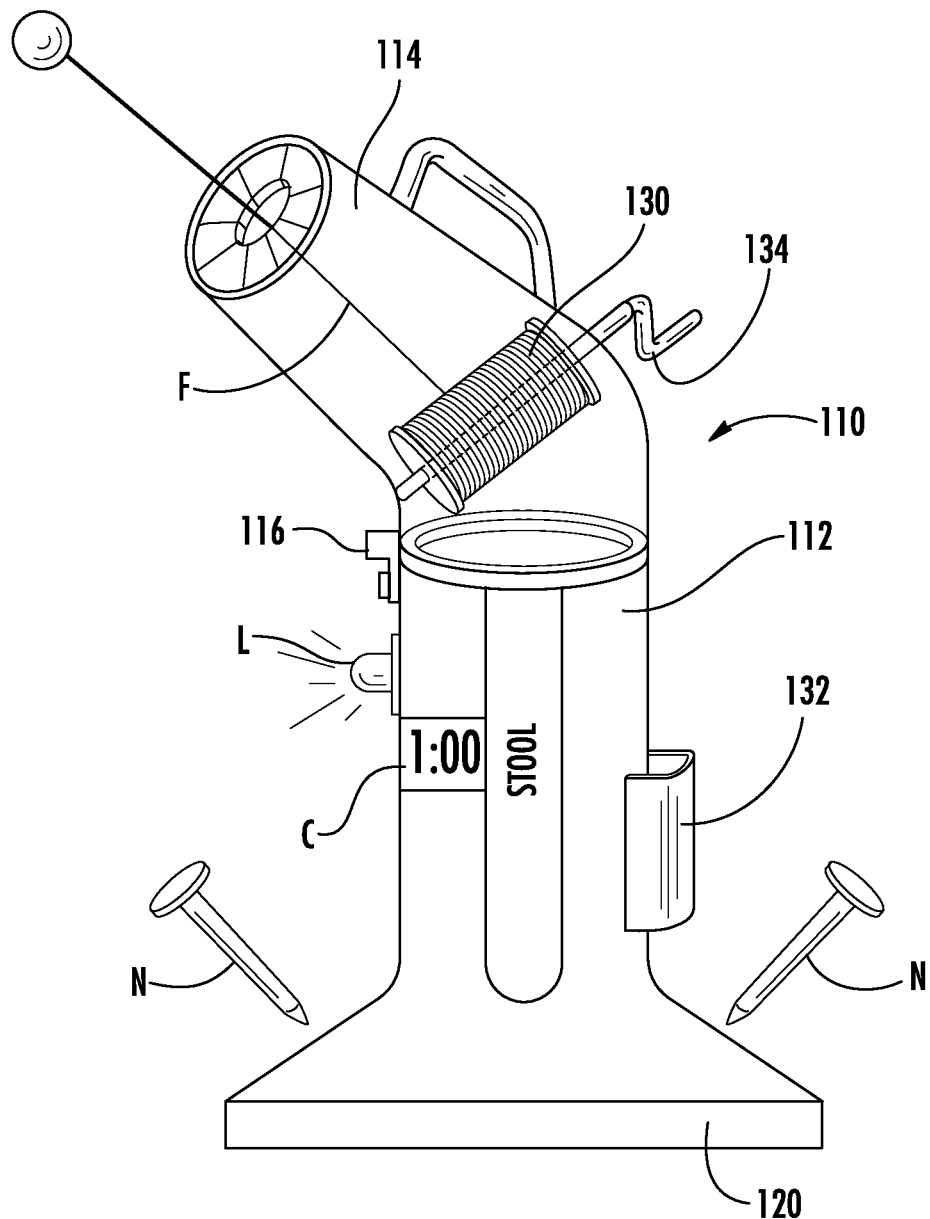
FIG. 2 is a side sectional view, in partial cutaway, showing one embodiment of lake or river fishing rod per a second embodiment.
Figure 3:
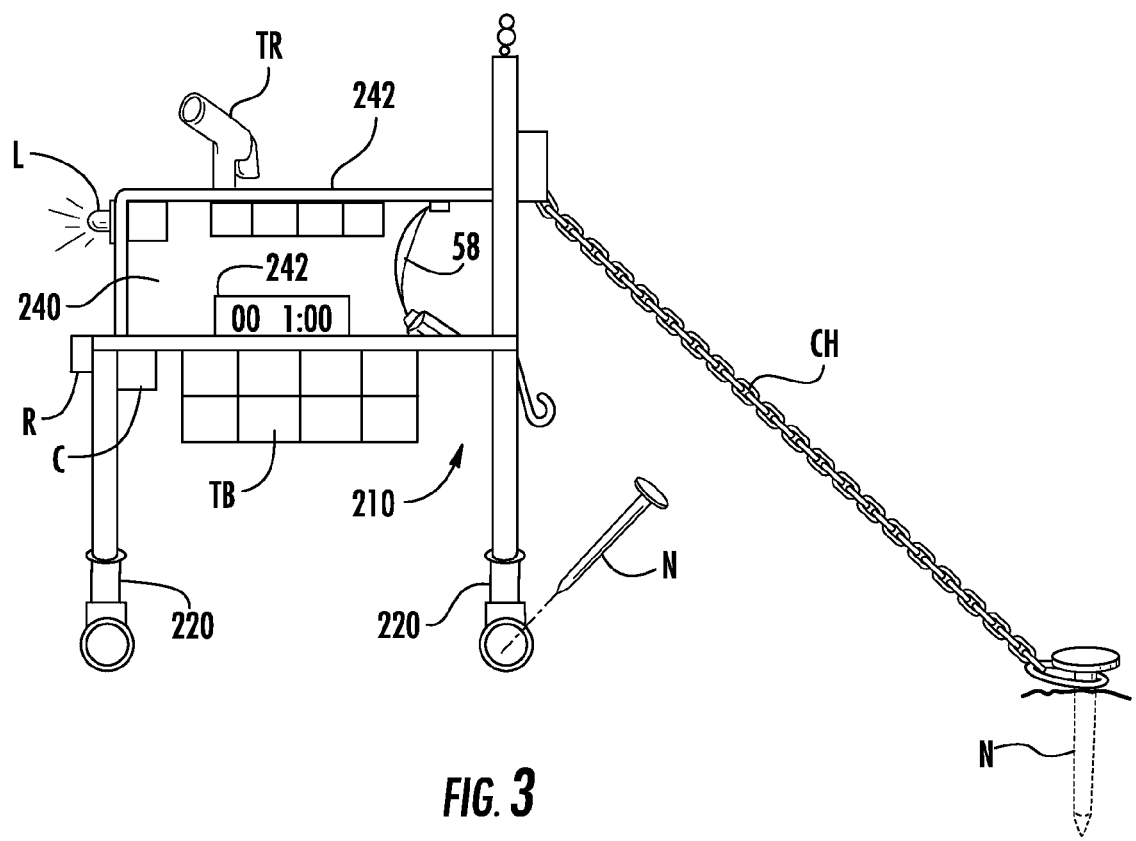
FIG. 3 is a side schematic view of one embodiment of chair ground rod per a third embodiment.
Figure 4:
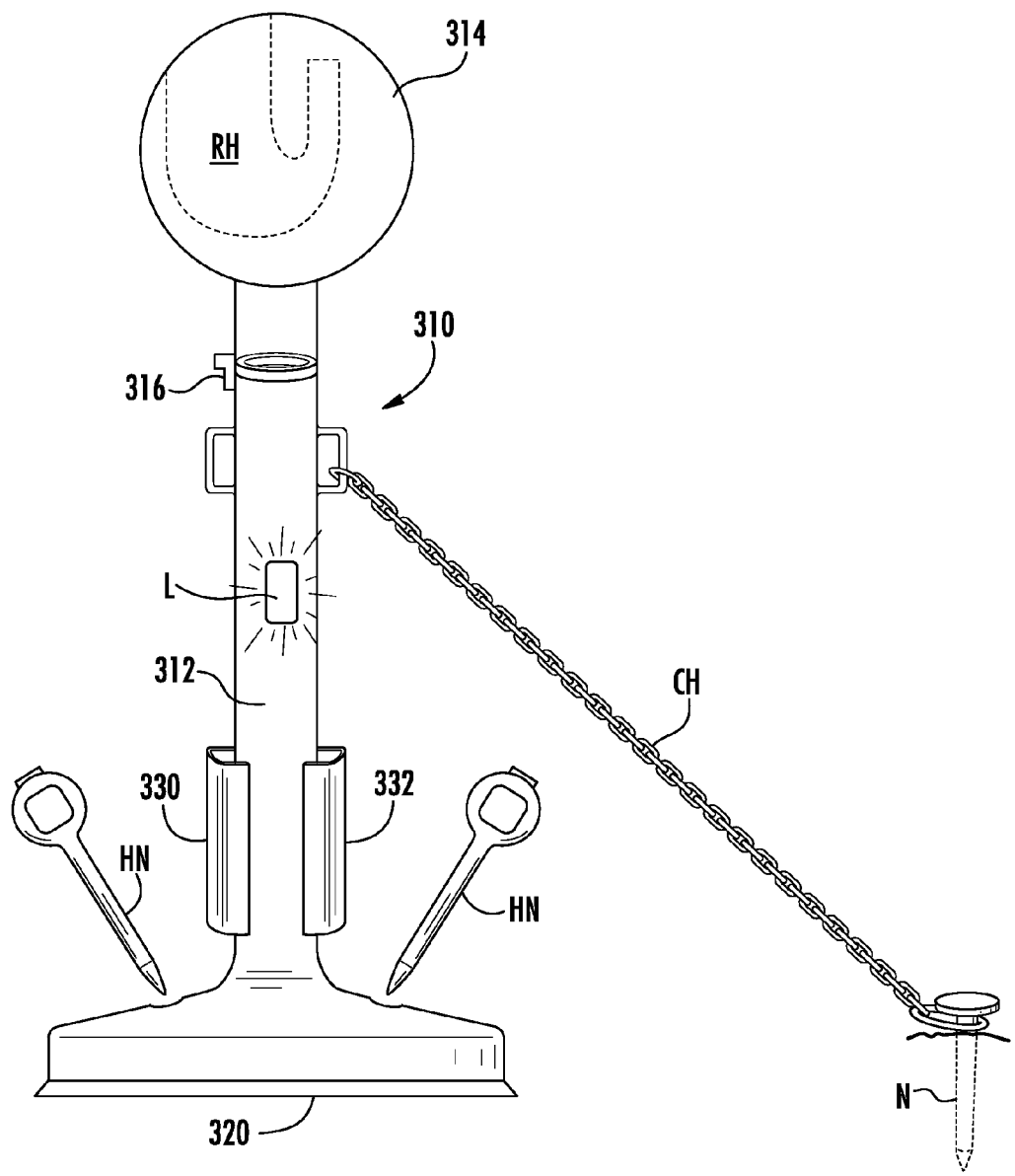
FIG. 4 is a front sectional view, in partial cutaway, showing one embodiment of rod holder per this invention.

The Ground Rods are four fishing rods that literally "nail" into the ground. These all use big nails for attachment to the ground of an ocean/beach (FIG. 1), lake or river shore (FIG. 2), via a ground-mounted, fishing chair (FIG. 3) and/or universal rod holder (FIG. 4).

Figure 1:
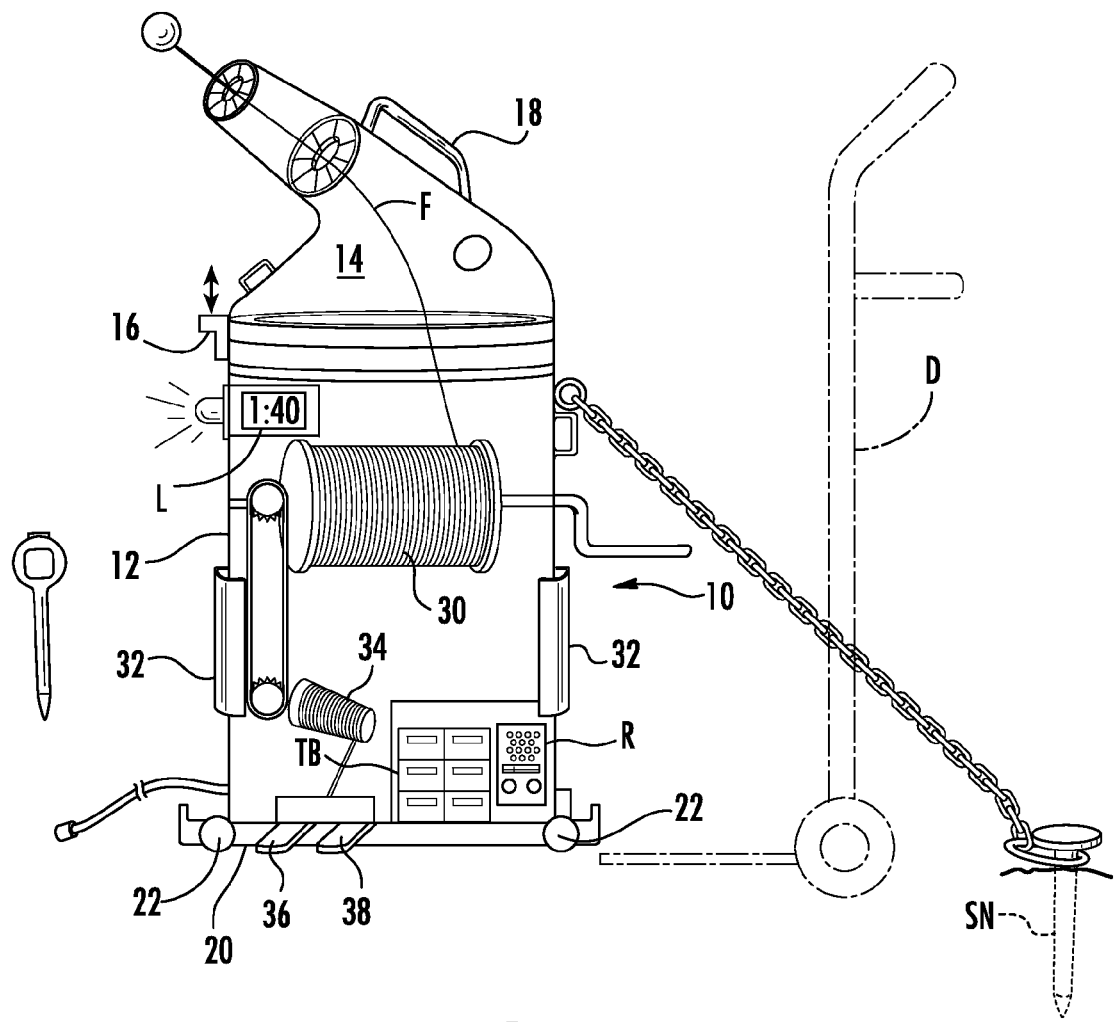
FIG. 1 is a side sectional view, in partial cutaway, showing one embodiment of ocean rod according to a first embodiment of this invention.

FIG. 1 shows one preferred embodiment of ocean ground rod 10. It includes a main housing unit 12 atop of which sits a nozzle shaped top 14 with its own lock 16. The device further includes a handle 18 that can be flicked for casting the line in water and catching bigger fish (per the top section of FIG. 1).

Preferably, ocean rod device 10 further includes a hard rubber bottom 20 which can be oval or square in shape. The rod can have one or two integral wheels 22 in the front, rear or at both ends. It can also incorporate a standard two wheel, or a specially made dolly D with it. The ocean rod will have six (6) nails for holding it in place.

Inside main housing 12, there is positioned a reel 30 of fishing line F. On a preferred basis, the exterior to main housing 12 includes a plurality of nail holders 32.

Options on the mailbox resembling apparatus may further include spinners/fishing line winders/rewinders 34 with two pedals, one for reversing 36 and the other 38 for fast forwarding. Still better equipped models have a light L, radio R and tackle box TB included.

The ground rods can be made from any of several material types, including metal, plastics, rubber, composites and combinations thereof.

A second variation of this fishing device 110, a so-called Model 2, is for a Lake or River Fishing. That ground rod apparatus can be held in place with two hammerable nails N. Like the larger, ocean version, this lake/river model 110 has a main housing 112 with a nozzle shaped top 114 and its own lock 116. It incorporates a flick or line-casting handle 118 that can also be used for carrying smaller model device 110 to and from the user's preferred fishing site. At the base of this model is a hard rubber bottom 120.

Internal to this variation is a spinner 130 with manual wind/rewind 134. For holding nails N when not in use, main housing 112 includes a plurality of nail holders 132.

Optional additions to this second, smaller model include a battery-powered light L, clock C, chair/stool storage chamber S in this shore-fishing unit.

Yet another variation is a Chair Ground Rod 210, or Model 3 type herein. That model would have, in addition to a user seating area 240, with preferred arm rests 242, options such as a light L, fishing rod holder FR, radio R and clock C. The bottom to the chair can rest on, or over, a typical tackle box TB.

Preferred embodiments would be secured through hard rubber nail holders 220 using nails N with a supplemental chain connector CH added to the back end of chair rod unit 210 for better assuring securement to the ground near the ocean, beach, lake or river shore. Most preferably, these models would include a seat belt SB for the wearer/user.

Several of these models may weigh up to 60-80 pounds, or up to about half of a grown man. Despite their size, it is preferred that all such units be capable of being picked up and carried to a preferred fishing site for installation (i.e., affixing to the ground) and use. For the dolly toting varieties, they can be wheeled along a beach or other mostly flat surface.

Various models may include one or more options selected from: a net holder, light, clock, radio, tackle box, television, DVD, camera, gas motor, electrical motor, catapult, special dolly, seat belt and/or binoculars.

Yet another model device 310, about half the size of an adult male, can include a rod holder RH with flipping, line flicking head 314, a locking spinner 316 intermediate the device, a square or oval-shaped cross-sectional main support post 312, with optional light L and plurality of nail holders 332. Preferably, this model would be secured with both handle nails HN and a secondary chain anchor CH.

Per FIG. 5A, the invention uses one of three types of nails: a main spike or nail (element N in FIGS. 1 through 3), a square top nail (element SN in FIG. 5A), and a new handled type nail that can be secured with a hammer, nail jack or the like and then pulled up from and out of the ground. This type of nail, generally HN, may have round or squared hand holes, used for pulling the nail from the ground, by hand, when no longer needed for device anchoring. They can be made from hard plastic or metals, like steel, stainless steel or aluminum. FIG. 5A also shows a nail jack NJ useful for picking up or prying out a stubborn nail whose extraction can't be 'started' by hand pulling alone.

The ground rods have a hook holder HH component on their bottom ends, that HH component goes down (in) to the ground for keeping the rods steady/steadier. The rods also have a spinner with a lock on it.

The scent bait holder BH varieties can include means for attaching food products, hair and/or feathers in one or more intentional slices, cuts or "splits" in each individual bait (with one or more hook attachments A included with each). See, FIG. 5C for these variations.

There is also an inflatable (blown up) star or cone shape used as an inflatable bobber IB with cast fishing lines as depicted at accompanying FIG. 5D. They may or may not include additional lights/light sources.

Finally, one other variety of food bait delivery for use with these inventions is a kayak-shaped food surfboard KS with correspondingly sized oar O as shown in accompanying FIG. 5E.

What is claimed is:

1. An ocean rod fishing device comprising:
   (a) a main housing unit configured to be secured to a ground surface with a plurality of hammerable nails;
   (b) a reel of fishing line stored on a spool in the main housing unit;
   (c) a nozzle-shaped, lockable top for the main housing unit through which the fishing line is threaded; and
   (d) a handle on the lockable top for spinning and flicking the lockable top in order to cast the fishing line outwardly therefrom.

2. The ocean rod fishing device of claim 1, which further includes a hard rubber bottom.

3. The ocean rod fishing device of claim 2 wherein said hard rubber bottom is square-shaped.

4. The ocean rod fishing device of claim 2 wherein said hard rubber bottom is oval-shaped.

5. The ocean rod fishing device of claim 1, which further includes a plurality of integral wheels for transporting to a fishing location.

6. The ocean rod fishing device of claim 1, which further includes a fishing line winder/rewinder with two pedals, a first pedal for reversing line winding and a second pedal for fast forwarding line winding.

7. The ocean rod fishing device of claim 1, which can be transported to a fishing location with a dolly.

8. The ocean rod fishing device of claim 1, which can be secured to a fishing location with six holding nails.

9. A lake or river fishing device comprising:
   (a) a main housing unit configured to be secured to a ground surface with two or more hammerable nails;
   (b) a reel of fishing line stored on a spool in the main housing unit;
   (c) a nozzle-shaped, lockable top for the main housing unit through which the fishing line is threaded; and
   (d) a handle on the lockable top for: (i) spinning and flicking the lockable top to cast the fishing line outwardly therefrom; and (ii) hand carrying the fishing device to a fishing location.

10. The lake or river rod fishing device of claim 9, which further includes a hard rubber bottom.

11. The lake or river rod fishing device of claim 9 where said hard rubber bottom is square or oval-shaped.

12. The lake or river rod fishing device of claim 9, which further includes a fishing line winder/rewinder.

13. The lake or river rod fishing device of claim 9, which further includes an integral light.

14. The lake or river rod fishing device of claim 9, which further includes a battery-powered clock.

15. The lake or river rod fishing device of claim 9, which further includes a stool that can be stored in the main housing unit when not in use.

* * * * *